Sept. 5, 1950   M. F. LICHTENFELS   2,521,380
CENTRIFUGAL SEPARATOR
Filed Feb. 5, 1948   2 Sheets-Sheet 1
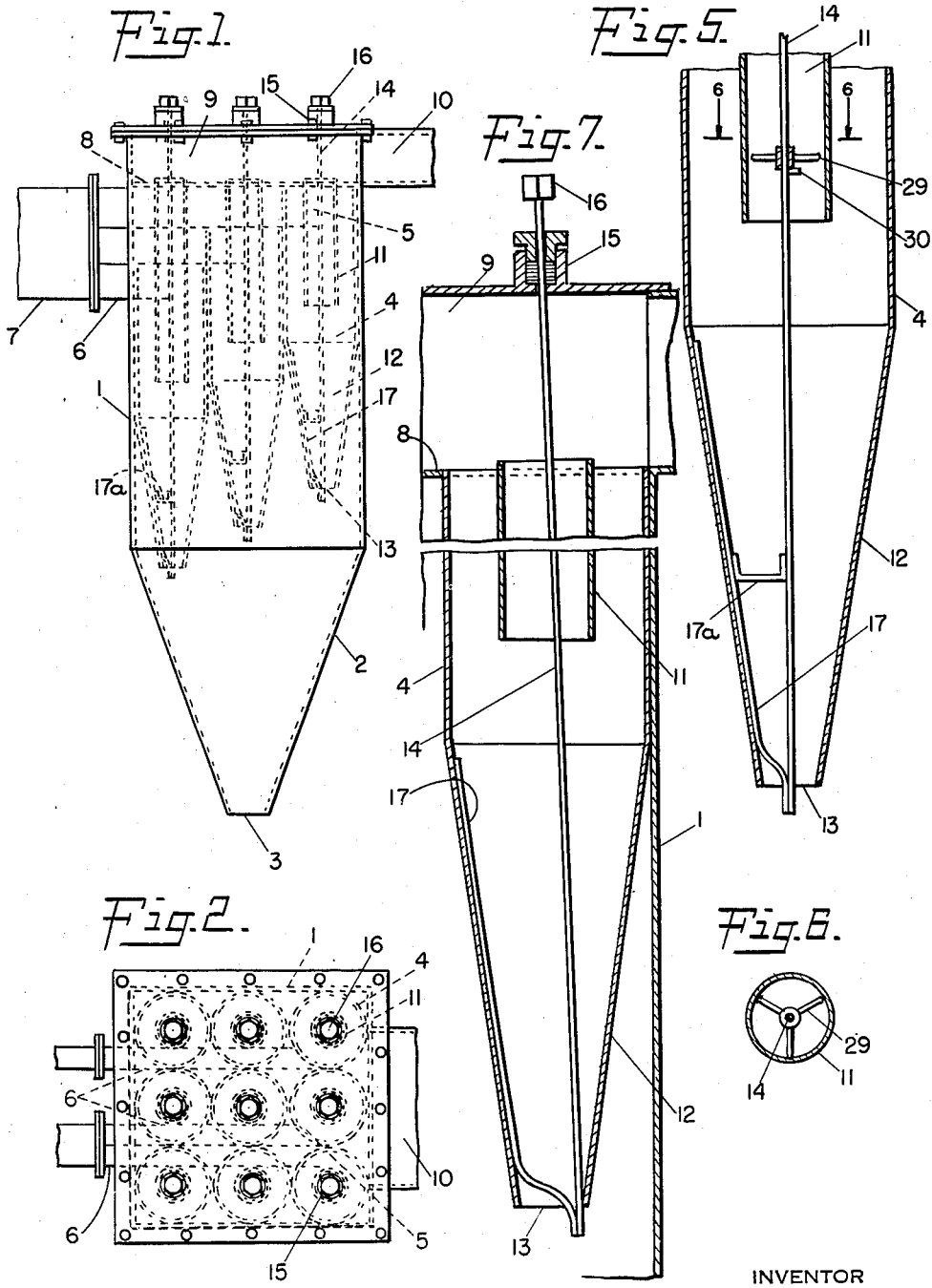
INVENTOR
MERLE F. LICHTENFELS
BY
Pennie, Edmonds, Morton & Barrows
ATTORNEYS Sept. 5, 1950   M. F. LICHTENFELS   2,521,380
CENTRIFUGAL SEPARATOR
Filed Feb. 5, 1948   2 Sheets-Sheet 2

INVENTOR
MERLE F. LICHTENFELS
BY
Pennie, Edmonds, Morton & Barrows
ATTORNEYS

Patented Sept. 5, 1950

2,521,380

UNITED STATES PATENT OFFICE 2,521,380

CENTRIFUGAL SEPARATOR

Merle F. Lichtenfels, Monroe, La., assignor to Columbian Carbon Company

Application February 5, 1948, Serial No. 6,451

8 Claims. (Cl. 183—81)

This invention relates to improvements in the centrifugal separation of aerosols from gaseous media and provides improved apparatus especially adapted to the carrying out of the process described and claimed in application Serial No. 553,265, of George L. Heller, filed September 8, 1944, now Patent No. 2,439,850. It will be appreciated, however, that the present invention is of broader application and is applicable generally to small size centrifugal separators of the cyclone type, especially those intended for use in the collection of finely divided suspended solid particles which upon flocculation and separation from the gaseous medium tend to cohere and to adhere to the inner surfaces of the lower, conical member of the separator.

The separator disclosed in said application comprises a cylindrical body portion not exceeding about 3 feet in diameter and of a height equal to about 1½ to 2 times its diameter, an outlet tube coaxially positioned in said body portion and extending downwardly into said body portion for a distance of about 1 to 1½ times the diameter of said body portion, the diameter of said outlet tube being about ½ the diameter of the cylindrical body portion, a cone-shaped member extending downwardly from the cylindrical body portion from a distance approximating the height of the said body portion and an entrance port entering into the upper portion of the cylindrical body portion and having an area of about ⅛ the square of the diameter of said body portion.

Small cyclone separators of this type are with advantage used connected in parallel, a plurality of the separators being housed in a common chamber or housing, the lower portion of which constitutes a common hopper into which the solids collected in the several small separators pass through the relative small openings in the lower ends of their conical member.

The invention is of especial utility as applied to multiple separators such as just described, but may likewise be used, with advantage, in separators composed of a single small unit, i. e., not exceeding about 3 feet in diameter. In such separators, whether used in multiples or as single units, the lower opening is usually about 1½ to 3 inches in diameter—seldom, if ever, over 5 to 6 inches.

The process and apparatus described in the above noted application have been found highly effective in the separation of furnace carbon black from effluent furnace gases. Its use, however, has been subject to the objection that, when operating on very heavy furnace blacks of high oil content there is a tendency for the separated black to adhere to the inner surfaces of the small cone-shaped element forming the lower end of the small cyclones and to bridge over and more or less constrict the lower exit. Where the unit is in operation over long periods, as is frequently the case in commercial practice, the black has, on occasions, been found to accumulate in the conical member to such an extent as to clog, or partly clog, the small passageways and to interfere with the operation.

In large cyclone separators, say, 10 to 13 feet in diameter, it has previously been proposed to employ scrapers to remove the deposit from the cone surfaces. However, in small size units such as described in said application, the use of scrapers has heretofore been impractical since scrapers such as previously proposed would unduly constrict the already small passages through the separator and thereby further aggravate the difficulty.

It has heretofore been supposed that a scraper to be effective in scraping the deposits from the cone-shaped hopper of cyclone separators must be rigidly supported at both its upper and its lower ends, necessitating the use of a rigid lower bearing which, in turn, would be supported by brackets, or the like, positioned near the lower, constricted end of the conical member of the separator. Such construction would unduly constrict the small conical hopper and hopper outlet in small sized separators and for that reason be impractical.

The present invention provides an improvement in cyclone type separators, applicable more particularly to such separators having a body portion not exceeding about 3 feet in diameter, and advantageously 12 to 15 inches in diameter, whereby the plugging-up of the relatively small conical hopper member and the lower outlet from the separator by the adhering of the solids to the walls thereof is avoided without appreciable interference with the collecting efficiency of the separator.

I have discovered that the previously noted difficulties experienced in the operation of such small cyclone separators may be avoided by the use of a scraper assembly of light construction, rotatably and flexibly supported at or near its upper end substantially coaxially with the separator and extending downwardly from a point above the separator to a point at or near the lower end thereof, the lower end of the assembly being free to move horizontally within the bounds of the lower portion of the conical member, thus avoiding the use of a lower bearing support.

In accordance with my present invention, I provide these small separators with a free-floating, rotatable scraper assembly comprising a generally coaxially positioned shaft flexibly suspended at its upper end and hanging downwardly through the separator, extending from a point above the separator housing to a point at or near the small end of the cone and having a scraper member secured to the lower end of the shaft and extending upwardly along the inner surface of the conical member. The lower end of the scraper assembly may extend through the lower opening of the conical member so as to confine its horizontal movement to the bounds of the opening or it may terminate slightly above the lower opening. No other horizontal support is provided for the lower end of the scraper assembly. The scraper member may be secured to the lower end of the shaft as by welding and extending backward along the shaft forming an angle therewith approximating the inclination of the walls of the conical hopper from the vertical. As an alternative, the scraper member may be a continuation of the shaft bent to the desired angle.

The scraper assembly may be suspended from near its upper end, or may be free to move vertically through the upper support and supported vertically by the inner surface of the conical hopper member. In the latter case, the shaft of the scraper assembly normally will be inclined somewhat from the vertical, at least over its lower portion, and the angle between the shaft and the scraper member is, with advantage somewhat larger, such that the scraper member will coincide generally with the inner conical surface of the hopper. With this arrangement, it is particularly advantageous that the shaft be flexibly supported at its upper end so as to avoid undue flexing of the shaft during operation.

To operate the scraper, the vertical shaft is rotated by power applied to the end of the shaft projecting upwardly through the housing. It is generally unnecessary to rotate the scraper continuously even under most severe conditions. Normally, a few turns of the scraper each day will suffice. Complicated machinery for rotating the scrapers is unnecessary as their light construction and free-floating arrangement materially reduces the power required to operate them. It is usually advantageous to thread, weld, or otherwise secure to the extreme upper end of the shaft an irregular shaped member, for instance, a square or hexagonal nut, or the like, adapted to be readily and intermittently connected with, and disconnected from, a source of power such as a speed wrench or portable electric drill for turning the scrapers at predetermined intervals. As an alternative, a hand crank may be used.

The invention will be further described and illustrated by reference to the accompanying drawings which represent an advantageous embodiment of my invention in multi-cyclone separators such as disclosed in the above referred to application and of which—

Figure 1 is a vertical sectional view of a multi-cyclone separator composed of nine small cyclone units;

Figure 2 is a plan view of Figure 1;

Figure 5 is a somewhat enlarged fragmentary vertical sectional view of the lower portion of the individual cyclone units of Figures 1 and 3.

Figure 6 is a sectional view of the outlet tube and scraper assembly along the line 6—6 of Figure 5, and Figure 7 is a somewhat enlarged, fragmentary, vertical sectional view showing a modified arrangement of the scraper assembly.

Figure 3:
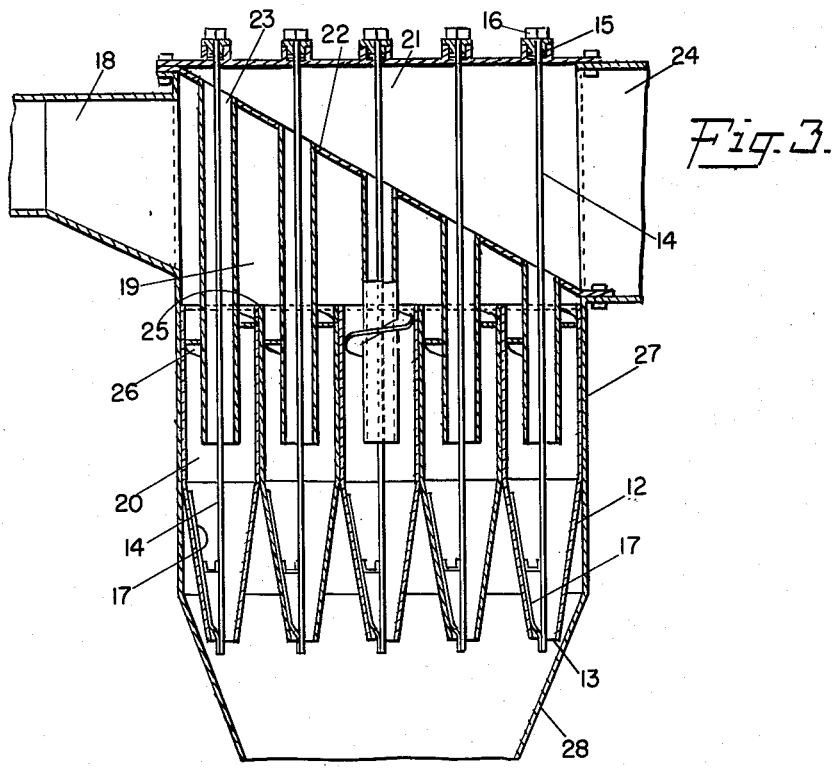
Figure 3 is a vertical sectional view of a multi-cyclone separator of somewhat different construction and composed of thirty small units.

Referring more particularly to Figures 1, 2 and 5 of the drawings, the apparatus comprises a rectangular metal housing 1 with a cone-shaped hopper portion 2 extending downwardly to the discharge outlet 3 which is provided with a conventional air lock, not shown. Suspended within the housing 1 are nine separator units 4, each provided with a tangential inlet 5 connected with individual ducts 6 to a main duct 7 which leads from the source of the suspension to be separated, for instance, a conventional form of electrical precipitator, not shown. The ducts 6 enter the respective units tangentially at the upper end of the cylindrical body of the unit. The individual units are arranged in rows of 3 each, the upper end of the cylindrical body of each unit of the row being positioned at different heights, as shown, so as to provide space for the ducts 6 to pass over the forward units to the rearward units.

The upper portion of the rectangular housing 1 is partitioned by a plate 8 to form an upper manifold chamber 9 into which the effluent gases from the respective units pass and from thence pass from the apparatus through effluent gas duct 10.

Coaxially suspended within the respective units 4 are cylindrical outlet tubes 11 extending downwardly through the plate 8 into the cylindrical body portion of the unit 4 to a point well below the tangential inlet to the unit. The upper ends of the respective units 4 are sealed by coverplate 8 through which the outlet tubes 11 pass and to which they are secured as by welding.

Projecting downwardly from the lower end of the cylindrical body portion of the respective cyclone units is a conical hopper portion 12 terminating in the discharge outlet 13 for the separated solids.

Each of the small cyclone units is equipped with a scraper assembly comprising a vertical shaft 14 coaxially suspended with respect to the cylindrical body portion of the separator by the upper end of the shaft which projects through the upper plate of the housing through a loose fitting bearing or stuffing box 15. Welded to the extreme upper end of each of the shafts is a hexagonal nut 16 from which the shaft is suspended.

The lower end of the shaft of the scraper assembly extends through the opening 13 in the lower end of the hopper member 12. A rigid scraper member 17 is welded, or otherwise securely fastened, to the lower end of shaft 14 at an angle such that the scraper member projects upwardly and outwardly along the inner surface of the conical member 12 when the shaft 14 is in the vertical position. The scraper member 17 may also be supported by the bracket 17a secured to the shaft 14 as by welding. However, this support may frequently be omitted, especially in smaller sized apparatus. Due to the free-floating suspension of the scraper assembly, the lower end of the assembly is free to move horizontally within the bounds of the opening 13 and it is not essential that the scraper member 17 coincide precisely with the inner surface of the hopper member 12.

Figure 4:
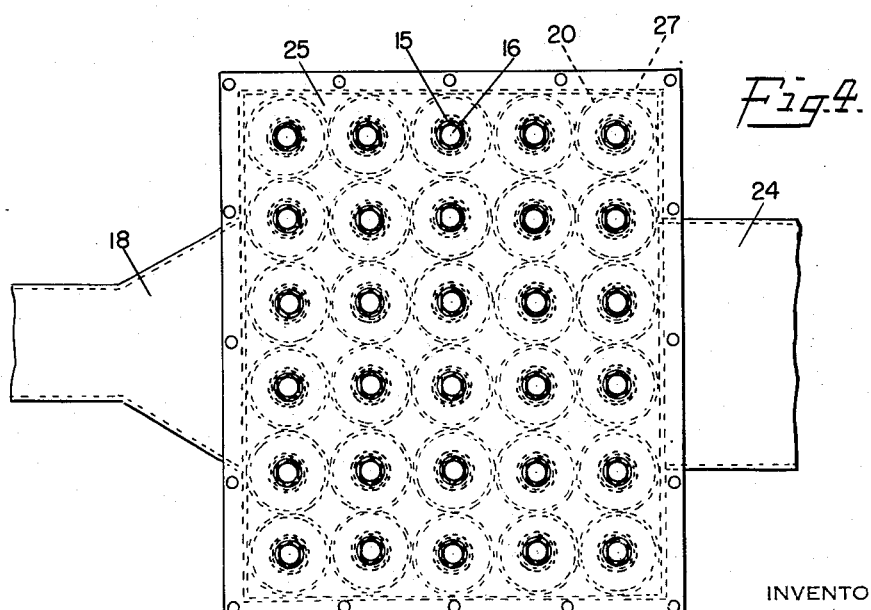
Figure 4 is a plan view of Figure 3.

In the modified arrangement of the apparatus shown in Figures 3 and 4 of the drawings, the suspension to be separated is passed to the apparatus through duct 18 to the manifold chamber 19 which is in open communication with the upper ends of the individual separator units 20. Surmounting the manifold chamber 19 is a second manifold chamber 21, separated from chamber 19 by the inclined plate 22. Outlet tubes 23 are suspended from the plate 22, to which they are fastened as by welding or beading, and extend downwardly for a substantial distance into the cylindrical body portion of the respective units 20 and are coaxially positioned with respect to the respective separating units. The outlet tubes 23 are open at their top and bottom and form a connection between the lower portion of the cylindrical body portion of the units 20 and the manifold chamber 21 through which the gases from the separator units pass to chamber 21 and, from thence, pass from the apparatus through conduit 24, for instance, to a secondary unit of similar design.

The body portions of the individual units 20 are suspended from the web plate 25 which is provided with openings of a diameter equal to the inside diameter of the cylindrical body portion of the units 20 and beneath which the respective units 20 are fastened as by welding.

The suspension enters the respective units from the top and is given a whirling motion by means of the spirals 26, thus being thrown tangential to the body portion of the separators. Even distribution of the incoming suspension is attained by reason of the decreased cross-sectional area of the chamber 19 due to the inclination of the partition 22. The spiral 26 advantageously extends completely across the annular entrance to the unit and may be suspended therein as by welding to the walls of the outlet tubes 23 or to the inner walls of the respective units or both. It is usually desirable that the spiral make not more than 1¼ turns about the tube 23.

The entire multi-separator comprising 30 individual units is housed by housing 27 which terminates in a conical hopper 28, shown in Figure 3 of the drawings, broken away at its lower end.

Each of the individual units is provided with a scraper assembly and a conical hopper member similar to those described with reference to Figures 1 and 2, like parts being indicated by corresponding reference numerals.

It is frequently desirable to use a great number of single small units in a multi-cyclone separator such as described, often considerably in excess of 100. Where the units are arranged as shown herein, the shafts of the scraper assemblies will be quite long, especially those of the lower units. Under such circumstances, it is desirable to provide some intermediate horizontal support for the shaft. This is, with advantage, accomplished by a spider of light construction, such as shown at 29 of Figures 5 and 6. The spider there shown fits loosely on the shaft 14 and within the lower portion of the outlet tube 11 and is prevented from slipping down below the lower end of the outlet tube by the pin 30 which is fastened to the shaft by welding, for instance.

The scraper 17 is, with advantage, constructed of square edge flats of sufficient thickness to be reasonably rigid, yet sufficiently flexible to permit the insertion of the scraper assembly through the outlet tube 11.

In the apparatus specifically described, the scraper assembly is suspended from its upper end, the downward thrust being carried by the hexagonal nut 16. It will be appreciated that other conventional shoulder arrangements may be used for this purpose.

In the modification shown in Figure 7, the scraper assembly is vertically supported by the converging surfaces of the small cone. With this arrangement, the shaft, being flexibly supported by the packing gland 15, will usually incline slightly from the vertical axis of the separator. This inclination is, for clarity, shown somewhat exaggerated in Figure 7 of the drawings, the angle of inclination depending, of course, upon the length of the shaft, the diameter of the cone at the points of support and the configuration of the lower end of the scraper assembly. It is usually desirable to minimize this inclination so as to avoid undue flexing of the shaft during rotation.

In the apparatus illustrated, the body portion of the respective units will not exceed about 3 feet in diameter and is, with advantage, about 12 to 15 inches in diameter. Other important factors in the design of the separators are the relative size of the entrance ports of the respective units, the relative diameter of the outlet tubes, each with respect to the diameter of the cylindrical body portion, the distance which the exit tube extends into the body of the unit below the entrance port and the length and angle of inclination of the conical lower portion of the unit. Each of these factors is of importance, if maximum separating efficiency of suspended agglomerates such as furnace black is to be effected.

More particularly, the outlet tube should extend sufficiently below the inlet to require that the incoming suspension make several complete spirals before any gas thereof can reach the entrance to the outlet tube. The transverse sectional area of the inlet to the individual unit is with advantage about ⅛ of the square of the diameter of the cylindrical body portion of the unit. The height of the cylindrical body portion of the unit should be at least 1½ times and advantageously twice its diameter. The outlet tube should extend downwardly into the cylindrical body portion of the unit coaxially with said body portion to a distance of about 1 to 1½ times the diameter of the body portion, but generally should terminate at a point not less than about ½ the diameter of the unit from the lower end of the cylindrical body portion. The inner diameter of the outlet tube should not exceed ½ the diameter of the cylindrical body of the unit and advantageously should be at about that maximum value. The length of the conical portion of the unit is, with advantage, about 1½ to 2 times the diameter of the unit, terminating in a discharge outlet advantageously of a diameter about ¼ of the diameter of the main body portion of the unit.

It will be noted, therefore, that the passages through the individual units are of necessity relatively small. Cumbersome scraper mechanism and bearing supports cannot, therefore, be tolerated if efficient separation is to be attained. For this reason, as previously noted, it has heretofore been supposed that the use of scrapers of any type in such small cyclone separators would be impractical. Contrary to such supposition, I have found that the efficiency of the separation is not materially impaired by the scraper assembly of my present invention. Further, the construction is so simple that it may be readily assembled and installed at little expense and its intermittent operation adds little to operating cost.

I claim:

1. A cyclone separator comprising a cylindrical body portion not exceeding 3 feet in diameter, an outlet tube coaxially positioned in the body portion, a cone-shaped hopper member having an opening at its lower end and extending downwardly from the cylindrical body portion, a scraper assembly comprising a shaft rotatably and horizontally supported at its upper end substantially coaxially with respect to the body portion of the separator and extending downwardly from without the separator and outlet tube through the outlet tube and hopper member to a point near the lower end of the latter and a scraper member secured to the lower end of the shaft and extending upwardly coinciding generally with the inner surface of the hopper member, the lower end of the scraper assembly being free to move horizontally within the bounds of the lower portion of the hopper member.

2. A cyclone separator comprising a cylindrical body portion not exceeding 3 feet in diameter, an outlet tube coaxially positioned in the body portion, a cone-shaped hopper member having an opening at its lower end and extending downwardly from the cylindrical body portion, a scraper assembly comprising a free-floating shaft extending downwardly from without the separator and outlet tube substantially coaxially with and through the outlet tube and hopper member and rotatably and flexibly supported at its upper end, a scraper member secured to the lower end of the shaft and extending upwardly along the inner surface of the conical member, the lower end of the scraper assembly being free to move horizontally within the bounds of the lower portion of the conical member.

3. A cyclone separator comprising a cylindrical body portion not exceeding 3 feet in diameter, an outlet tube coaxially positioned in the body portion, a cone-shaped hopper member having an opening at its lower end and extending downwardly from the cylindrical body portion, a scraper assembly comprising a free-floating shaft extending downwardly from without the separator and outlet tube substantially coaxially with and through the outlet tube and hopper member and rotatably and flexibly supported at its upper end, a scraper member secured to the lower end of the shaft and extending upwardly along the inner surface of the conical member, the lower end of the scraper assembly extending through the lower opening of the conical member and being free to move horizontally within the bounds of the opening.

4. A multiple cyclone separator comprising a housing, a plurality of parallel connected cyclone type separators enclosed in said housing each comprising a cylindrical body portion not exceeding 3 feet in diameter, an outlet tube coaxially positioned in said body portion, a cone-shaped hopper member having an opening at its lower end and extending downwardly from the cylindrical body portion, a scraper assembly comprising a free-floating shaft extending downwardly from without the outlet tube and housing substantially coaxially with and through the outlet tube and hopper member and rotatably and flexibly supported at its upper end, a scraper member secured to the lower end of the shaft and extending upwardly along the inner surface of the conical member, the lower end of the scraper assembly extending through the lower opening of the conical member and being free to move horizontally within the bounds of the opening.

5. A cyclone separator comprising a cylindrical body portion not exceeding 3 feet in diameter, an outlet tube coaxially positioned in the body portion, a cone-shaped hopper member having an opening at its lower end and extending downwardly from the cylindrical body portion, a scraper assembly comprising a free-floating shaft extending downwardly from without the separator and outlet tube substantially coaxially with and through the outlet tube and hopper member and rotatably and flexibly supported at its upper end, a scraper member secured to the lower end of the shaft and extending upwardly along the inner surface of the conical member, the lower end of the scraper assembly extending through the lower opening of the conical member and being free to move horizontally within the bounds of the opening and an irregular shaped member secured to the upper end of the shaft without the separator and adapted to be readily connected with and rotated by a rotating device.

6. A multi-cyclone separator comprising a housing, a plurality of parallel connected cyclone type separators enclosed in said housing, each comprising a cylindrical body portion not exceeding 3 feet in diameter and of a height equal to about 1½ to 2 times its diameter, an outlet tube coaxially positioned in said body portion and extending downwardly into the body portion for a distance of about 1 to 1½ times the diameter of said body portion, the diameter of said outlet tube being about ½ the diameter of the body portion, a cone-shaped hopper member extending downwardly from the cylindrical body portion for a distance approximating the height of the said body portion, and having an opening in its lower end approximately ¼ the diameter of the body portion, a scraper assembly comprising a free-floating shaft extending downwardly from without the outlet tube and housing substantially coaxially with and through the outlet tube and hopper member and rotatably and flexibly supported at its upper end, a scraper member secured to the lower end of the shaft and extending upwardly along the inner surface of the conical member, the lower end of the scraper assembly extending through the lower opening of the conical member and being free to move horizontally within the bounds of the opening.

7. A multi-cyclone separator comprising a housing, a plurality of parallel connected cyclone type separators enclosed in said housing, each comprising a cylindrical body portion not exceeding 3 feet in diameter and of a height equal to about 1½ to 2 times its diameter, an outlet tube coaxially positioned in said body portion and extending downwardly into the body portion for a distance of about 1 to 1½ times the diameter of said body portion, the diameter of said outlet tube being about ½ the diameter of the body portion, a cone-shaped hopper member extending downwardly from the cylindrical body portion for a distance approximating the height of the said body portion, and having an opening in its lower end approximately ¼ the diameter of the body portion, a scraper assembly comprising a shaft rotatably and horizontally supported at its upper end, substantially coaxially with respect to the body portion of the separator, and extending downwardly from without the outlet tube and housing through the outlet tube and hopper member to a point near the lower end of the latter and a scraper member secured to the lower end of the shaft and extending upwardly coinciding generally with the inner surface of the hopper member, the lower ends of the scraper assembly being free to move horizontally within the bounds of the lower portion of the hopper member.

8. A cyclone separator comprising a cylindrical body portion not exceeding 3 feet in diameter, an outlet tube coaxially positioned in the body portion, a cone-shaped hopper member having an opening at its lower end and extending downwardly from the cylindrical body portion, a scraper assembly comprising a shaft rotatably and horizontally supported at its upper end substantially coaxially with respect to the body portion of the separator, and extending downwardly from without the separator and outlet tube through the outlet tube and hopper member to a point near the lower end of the latter and a scraper member secured to the lower end of the shaft and extending upwardly coinciding generally with the inner surface of the hopper member, the scraper assembly being vertically supported by the converging surfaces of the hopper member and the lower end of the scraper assembly being free to move horizontally within the bounds of the lower portion of the hopper member.

MERLE F. LICHTENFELS.

REFERENCES CITED

The following references are of record in the file of this patent:

UNITED STATES PATENTS

| Number | Name | Date |
| --- | --- | --- |
| 470,523 | Wardhaugh | Mar. 8, 1892 |
| 470,524 | Wardhaugh | Mar. 8, 1892 |
| 470,608 | Wardhaugh | Mar. 8, 1892 |
| 1,145,903 | Lehrack et al. | July 13, 1915 |
| 2,323,708 | Danz | July 6, 1943 |
| 2,438,827 | Shoffner | Mar. 30, 1948 |